United States Patent
Kim et al.

(10) Patent No.: US 10,146,000 B2
(45) Date of Patent: Dec. 4, 2018

(54) POLARIZING PLATE, METHOD FOR MANUFACTURING THE SAME, AND OPTICAL DISPLAY INCLUDING THE SAME

(71) Applicant: Samsung SDI Co., Ltd., Yongin-si, Gyeonggi-do (KR)

(72) Inventors: Yi Eun Kim, Uiwang-si (KR); Won Kim, Uiwang-si (KR); Ha Yun Cho, Uiwang-si (KR); In Cheon Han, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 147 days.

(21) Appl. No.: 14/675,249

(22) Filed: Mar. 31, 2015

(65) Prior Publication Data

US 2015/0277005 A1    Oct. 1, 2015

(30) Foreign Application Priority Data

Mar. 31, 2014    (KR) .................. 10-2014-0038276

(51) Int. Cl.
*G02B 1/14*      (2015.01)
*G02B 5/30*      (2006.01)

(52) U.S. Cl.
CPC ............... *G02B 5/305* (2013.01); *G02B 1/14* (2015.01); *G02B 5/3033* (2013.01)

(58) Field of Classification Search
CPC ... G02B 1/10; G02B 1/14; G02B 5/30; G02B 5/3025; G02B 5/3033; G02B 5/305
See application file for complete search history.

(56) References Cited

U.S. PATENT DOCUMENTS

| 2001/0009474 A1* | 7/2001 | Umemoto ............ G02B 5/3025 |
| | | 359/485.01 |
| 2011/0109847 A1* | 5/2011 | Nagase .................. C08L 33/14 |
| | | 349/96 |

(Continued)

FOREIGN PATENT DOCUMENTS

| CN | 1815324 A | 8/2006 |
| CN | 103525315 A | 1/2014 |

(Continued)

OTHER PUBLICATIONS

Korean Office action dated Jun. 15, 2016, corresponding to Korean Patent Application No. 10-2014-0038276 (7 pages).

(Continued)

*Primary Examiner* — Derek S Chapel
(74) *Attorney, Agent, or Firm* — Lewis Roca Rothgerber Christie LLP

(57) ABSTRACT

A polarizing plate, a method for manufacturing the same, and an optical display including the same are disclosed. The polarizing plate includes a polarizer, a protective coating layer on one surface of the polarizer, and an adhesive layer on one surface of the protective coating layer. The polarizing plate satisfies inequality 1.

$R_{max} - R_{min} \leq 0.02$      (1)

In Inequality 1, Rmax is the maximum index of refraction among the indexes of refraction of the polarizer, the protective coating layer and the adhesive layer, and Rmin is the minimum index of refraction among the indexes of refraction of the polarizer, the protective coating layer and the adhesive layer.

15 Claims, 2 Drawing Sheets

(56) References Cited

U.S. PATENT DOCUMENTS

2012/0113356 A1* 5/2012 Yu .................... G02B 5/305
   349/62
2014/0060734 A1* 3/2014 Ikeda ................ B29D 11/0073
   156/331.6

FOREIGN PATENT DOCUMENTS

| | | |
|---|---|---|
| JP | 2007249191 A | 9/2007 |
| JP | 2008-015483 A | 1/2008 |
| JP | 2008262190 A | 10/2008 |
| JP | 2009157392 A | 7/2009 |
| JP | 2011102821 A | 5/2011 |
| JP | 2011-203709 A | 10/2011 |
| JP | 2014170223 A | 9/2014 |
| KR | 10-2011-0040304 A | 4/2011 |
| KR | 10-2013-0020618 A | 2/2013 |
| TW | 201139583 A | 11/2011 |
| TW | 201207449 A | 2/2012 |
| TW | 201403146 A | 1/2014 |
| TW | 201411227 A | 3/2014 |

OTHER PUBLICATIONS

Taiwan Office action dated Jun. 7, 2016, corresponding to Taiwanese Patent Application No. 104110364 (5 pages).
Taiwanese Office Action dated Apr. 25, 2018 in corresponding Taiwanese Patent Application No. 104110364 (9 pages).

* cited by examiner

POLARIZING PLATE, METHOD FOR MANUFACTURING THE SAME, AND OPTICAL DISPLAY INCLUDING THE SAME

CROSS-REFERENCE TO RELATED APPLICATION

This application claims priority to and the benefit of Korean Patent Application No. 10-2014-0038276, filed on Mar. 31, 2014, in the Korean Intellectual Property Office, the entire content of which is incorporated herein by reference.

BACKGROUND

1. Field

One or more embodiments of the present invention relate to a polarizing plate, a method for manufacturing the same, and an optical display including the polarizing plate.

2. Description of the Related Art

A liquid crystal display includes polarizing plates stacked on the upper and lower surfaces of a liquid crystal display panel. The polarizing plate includes a polarizer and protective films formed on the upper and lower surfaces of the polarizer, and further includes an adhesive layer formed on the surface of the protective film to be stacked on the liquid crystal display panel. Recently, with the demand of thin polarizing plates and low material costs, TAC-less (i.e., triacetyl cellulose-less) polarizing plates including a protective film formed only on one surface of the polarizer have been in the spotlight.

Each of the polarizer, the protective film, and the adhesive layer has an index of refraction different from one another due to different (e.g., completely different) compositions thereof. Generally, the polarizer has an index of refraction of about 1.51, the protective film has an index of refraction of about 1.49, and the adhesive layer has an index of refraction of about 1.46. The TAC-less polarizing plates exhibit high reflectance at the interfaces between the polarizer and the protective film, and between the protective film and the adhesive layer, and thus generally have a transmittance of less than 43%. As such, liquid crystal displays including the polarizing plates having low transmittance may have reduced brightness. In addition, since the TACless polarizing plates include a protective film formed only on one surface of the polarizer, the TAC-less polarizing plates may detach from the liquid crystal display panels or the polarizers may crack when left alone at high temperatures and/or high humidities, and thus may exhibit reduced durability.

SUMMARY

Aspects according to one or more embodiments of the invention are directed toward a polarizing plate, a method for manufacturing the polarizing plate, and an optical display including the polarizing plate. The polarizing plate includes a polarizer and a protective film formed only on one surface of the polarizer. The polarizing plate has high transmittance and exhibits high durability even when allowed to stand at high temperatures and/or high humidities.

According to one or more embodiments of the present invention, a polarizing plate includes a polarizer, a protective coating layer on one surface of the polarizer, and an adhesive layer on one surface of the protective coating layer. The polarizing plate satisfies Inequality 1:

$$Rmax - Rmin \leq 0.02 \tag{1}$$

In Inequality 1, Rmax is the maximum index of refraction among the indexes of refraction of the polarizer, the protective coating layer and the adhesive layer; and Rmin is the minimum index of refraction among the indexes of refraction of the polarizer, the protective coating layer and the adhesive layer.

According to one or more embodiments of the present invention, a polarizing plate includes: a stack body including a polarizer and a protective coating layer on one surface of the polarizer; and an adhesive layer on one surface of the protective coating layer. The polarizing plate satisfies Inequality 2:

$$|R_L - R_a| \leq 0.015 \tag{2},$$

In Inequality 2, $R_L$ is the index of refraction of the stack body, and $R_a$ is the index of refraction of the adhesive layer.

In one embodiment, the polarizing plate may further include a protective film on the other surface of the polarizer.

In one embodiment, the polarizer may have an index of refraction of about 1.50 to about 1.52, the protective coating layer may have an index of refraction of about 1.45 to about 1.55, and the adhesive layer may have an index of refraction of about 1.49 or greater.

In one embodiment, the protective coating layer may include a polymer coating layer-including at least one of organic particles, inorganic particles and organic-inorganic particles.

In one embodiment, the protective coating layer may be formed of at least one of a water-based bonding agent and a UV curable bonding agent.

In one embodiment, the water-based bonding agent may further include inorganic fillers.

In one embodiment, the water-based bonding agent may include a polyvinyl alcohol resin, a zirconium compound, and a crosslinking agent.

In one embodiment, the UV curable bonding agent may include an epoxy compound, a (meth)acrylate compound, a photocationic polymerization initiator, and a photoradical polymerization initiator.

In one embodiment, the UV curable bonding agent may further include a heat stabilizer.

In one embodiment, the protective coating layer may include inorganic fillers.

In one embodiment, the inorganic fillers may include at least one of zirconium compounds, aluminum compounds, boron compounds, and titanium compounds.

In one embodiment, the adhesive layer may be formed of an adhesive composition including a (meth)acrylic copolymer, a curing agent, and a silane coupling agent.

In one embodiment, an absolute value of a difference between the index of refraction of the adhesive layer and the index of refraction of the stack body (including the polarizer and the protective coating layer) may be about 0.015 or less.

According to one or more embodiments of the present invention, a method for manufacturing the polarizing plate includes: forming a stack body by forming a protective coating layer having an index of refraction of about 1.45 to about 1.55 on one surface of a polarizer; and bonding an adhesive layer having an index of refraction of about 1.49 or greater to one surface of the protective coating layer.

In one embodiment, the method may further include bonding a protective film to the other surface of the polarizer.

In one embodiment, the polarizing plate may satisfy Inequality 2:

$$|R_L - R_a| \leq 0.015 \quad (2),$$

In Inequality 2, $R_L$ is the index of refraction of the stack body, and $R_a$ is the index of refraction of the adhesive layer.

According to one or more embodiments of the present invention, an optical display includes the polarizing plate as set forth above and below.

BRIEF DESCRIPTION OF THE DRAWINGS

These and/or other aspects will become apparent and more readily appreciated from the following description, taken in conjunction with the accompanying drawings in which.

DETAILED DESCRIPTION

Figure 1:
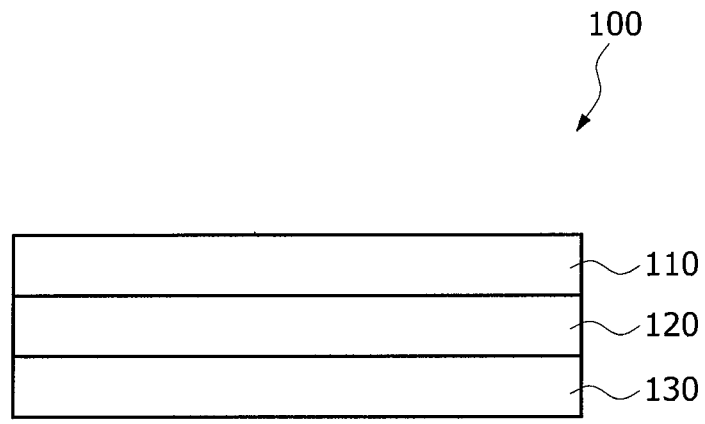
FIG. 1 is a schematic cross-sectional view of a polarizing plate according to an embodiment of the present invention.

Certain embodiments of the present invention will be described with reference to the accompanying drawings. It should be understood that the present invention is not limited to the following embodiments, which may be modified in different ways. In the drawings, portions irrelevant to the description are omitted for clarity. Like components are denoted by like reference numerals throughout the specification. Expressions such as "at least one of," when preceding a list of elements, modify the entire list of elements and do not modify the individual elements of the list. Further, the use of "may" when describing embodiments of the present invention refers to "one or more embodiments of the present invention."

As used herein, directional terms such as "upper" and "lower" are defined with reference to the accompanying drawings. Thus, it will be understood that the term "upper side (surface)" may be used interchangeably with the term "lower side (surface)". It will be understood that when an element such as a layer, film, region or substrate is referred to as being placed "on" another element, it may be directly placed on the other element, or intervening layer(s) may also be present. On the other hand, when an element is referred to as being directly placed "on" another element, intervening layer(s) are not present. The term "(meth)acrylate" may refer to acrylates and/or methacrylates. The term "index of refraction" may refer to a value obtained through irradiation with sodium ID rays (wavelength: 589 nm) at 25° C. using an Abbe refractometer (DR-M4, ATAGO Co., Ltd.). The index of refraction may be measured on an object having a thickness of about 10 nm to about 100 μm, but is not limited thereto.

According to one or more embodiments of the present invention, a polarizing plate may include a polarizer, a protective coating layer on a lower side (surface) of the polarizer, and an adhesive layer on a lower side (surface) of the protective coating layer. Indexes of refraction of the polarizer, the protective coating layer and the adhesive layer may be controlled to improve the transmittance of the polarizing plate. For example, the polarizing plate may include the polarizer, the protective coating layer on one surface of the polarizer, and the adhesive layer on one surface of the protective coating layer, and may satisfy Inequality 1:

$$R\text{max} - R\text{min} \leq 0.02 \quad (1),$$

In Inequality 1, Rmax is the maximum index of refraction among the indexes of refraction of the polarizer, the protective coating layer and the adhesive layer; and Rmin is the minimum index of refraction among the indexes of refraction of the polarizer, the protective coating layer and the adhesive layer.

According to one or more embodiments of the present invention, the polarizing plate may include: a stack body including the polarizer and the protective coating layer on one surface of the polarizer; and the adhesive layer one surface of the protective coating layer, and may satisfy Inequality 2:

$$|R_L - R_a| \leq 0.015 \quad (2),$$

In Inequality 2, $R_L$ is the index of refraction of the stack body, and $R_a$ is the index of refraction of the adhesive layer.

Further, the polarizing plate may further include a protective film on an upper side (surface) of the polarizer. In this case, the protective film is on one surface of the polarizer, and the protective coating layer and the adhesive layer are on the other surface of the polarizer. With such a structure, cracking of the polarizer at high temperatures and/or humidities may be prevented or reduced, and the polarizing plate may exhibit improved durability.

FIG. 1 is a schematic cross-sectional view of a polarizing plate according to one embodiment of the present invention. Referring to FIG. 1, the polarizing plate 100 includes a polarizer 110, a protective coating layer 120 on a lower side (surface) of the polarizer 110 and an adhesive layer 130 on a lower side (surface) of the protective coating layer 120. The polarizing plate may satisfy Inequality 1.

$$R\text{max} - R\text{min} \leq 0.02 \quad (1),$$

In Inequality 1, Rmax is the maximum index of refraction among the indexes of refraction of the polarizer, the protective coating layer and the adhesive layer; and Rmin is the minimum index of refraction among the indexes of refraction of the polarizer, the protective coating layer and the adhesive layer.

This means that a difference between the maximum and minimum values of the indexes of refraction of the polarizer 110, the protective coating layer 120 and the adhesive layer 130 may be about 0.02 or less. When the difference in the index of refraction is about 0.02 or less, for example, about 0.001 to about 0.02, reflectance at the interface between the polarizer and the protective coating layer, or between the protective coating layer and the adhesive layer may be reduced to improve the transmittance of the polarizing plate. For example, the polarizing plate may have a transmittance of about 43% or greater, or about 43% to about 45%, at a wavelength of about 400 nm to about 780 nm.

The polarizer may form polarization of incident light by transmitting only one-directional light (light with a specific polarization) out of the incident light. The polarizer may have an index of refraction of about 1.50 to about 1.52. Within this range, a difference in the index of refraction between the protective coating layer and the adhesive layer may be reduced to improve the transmittance of the polarizing plate.

The polarizer may be manufactured by expanding, dyeing and stretching a polyvinyl alcohol resin film. For example, the polyvinyl alcohol resin film may be manufactured by melting and extruding a polyvinyl alcohol resin having a degree of polymerization from about 1000 to about 3000 and a degree of saponification from about 95 mol % to about 99.9 mol % to form a polyvinyl alcohol resin film, followed by expanding the polyvinyl alcohol resin film in a swelling bath at a temperature of about 22° C. to about 35° C. The swelling bath may contain water, chloride, boric acid, an organic solvent, or the like. The swollen polyvinyl alcohol resin film may be dyed in an iodine solution having an iodine concentration of about 0.05% by weight (wt %) to about 0.2 wt % at about 20° C. to about 40° C., and then may be stretched at a stretching ratio of about 1.5 times to about 2.2 times. Before the expansion process, the polyvinyl alcohol resin film may be washed for removal of foreign substances attached thereto. Stretching may include wet stretching, dry stretching, or a combination thereof. Dry stretching may be performed by inter-roll stretching, heating roll stretching, extrusion stretching, tenter stretching, or the like; and wet stretching may be performed by tenter stretching, inter-roll stretching, or the like. Between dyeing and stretching, or after stretching, color correction may be further performed. It should be understood that the order of dyeing and stretching may be exchanged. The polyvinyl alcohol film may be stretched at a stretching ratio of about 2 times to about 4 times between expansion and dyeing. A final stretching ratio may be from about 5 times to about 8 times. By the method set forth above, a polarizer having an index of refraction of about 1.50 to about 1.52 may be manufactured. The polarizer may have improved uniformity of optical properties.

The polarizer may have a thickness of about 10 μm to about 50 μm. Within this range, the polarizer may be used for optical displays.

According to embodiments of the invention, the protective coating layer may reduce the difference in the index of refraction of neighboring material layers to be within a set or specific range in the polarizing plate, thereby improving the transmittance of the polarizing plate. In addition, the protective coating layer may protect the polarizer while improving the mechanical strength of the polarizing plate.

The protective coating layer may have an index of refraction of about 1.45 to about 1.55. Within this range, the difference in the index of refraction between the polarizer and the adhesive layer may be reduced, thereby improving the transmittance of the polarizing plate.

The protective coating layer may have a thickness of about 5 μm or less, for example, about 50 nm to about 200 nm. Within these ranges, the protective coating layer may be used for optical displays.

In some embodiments, the protective coating layer may be a non-adhesive polymer coating layer, in which organic particles, inorganic particles, organic-inorganic particles, and the like are mixed. The organic particles may include at least one of acrylic resins, styrene resins, styrene-acrylic resins, polyolefin resins including polyethylene resins, epoxy resins, vinyl chloride, vinyl acetate, vinyl ether, vinyl propionate, and vinyl butyrate. The inorganic particles may include at least one of silica, potassium carbonate, aluminum hydroxide, magnesium hydroxide, titanium dioxide, and zirconium oxide. The organic-inorganic particles may include particles obtained by modifying surfaces of the inorganic particles with a material of the organic particles. The polymer may include acrylic resin, epoxy resin, olefin resin, urethane resin, or the like.

In another embodiment, the protective coating layer may be an adhesive layer exhibiting adhesion. Such a protective coating layer may improve the binding force between the polarizer and the adhesive layer, thereby improving the mechanical strength of the polarizing plate. The protective coating layer exhibiting adhesion may be formed of at least one of a water-based bonding agent and/or a UV curable bonding agent.

The water-based bonding agent may include a water-based solvent (for example, water), a polyvinyl alcohol resin, a zirconium compound, and a crosslinking agent.

The polyvinyl alcohol resin may exhibit good adhesion to a polyvinyl alcohol polarizer. In some embodiments, the polyvinyl alcohol resin may include a non-modified polyvinyl alcohol resin. In other embodiments, the polyvinyl alcohol resin may include a modified polyvinyl alcohol resin. As such, when the modified polyvinyl alcohol resin is used, the modified polyvinyl alcohol resin may easily react with a water-soluble crosslinking agent. The bonding agent may exhibit good durability. The modified polyvinyl alcohol resin may include an acetoacetyl group-containing polyvinyl alcohol resin and/or a carboxyl group-modified polyvinyl alcohol resin containing a highly reactive functional group, but the modified polyvinyl alcohol resin is not limited thereto.

The degree of polymerization and the degree of saponification of the polyvinyl alcohol resin are not particularly limited. The polyvinyl alcohol resin may have a degree of polymerization of about 100 to about 3000 and a degree of saponification of about 90 mol % to about 95 mol % in consideration of adhesion. The polyvinyl alcohol resin may be included in the form of a powder, but is not limited thereto.

The polyvinyl alcohol resin may be present in an amount of about 1 part by weight to about 10 parts by weight, for example, about 2 parts by weight to about 6 parts by weight, in the water-based bonding agent, based on 100 parts by weight of water (or the water-based solvent). Within these ranges, the water-based bonding agent may exhibit good adhesion and reduce or minimize the change in optical properties of the polarizer.

The zirconium compound may improve adhesion to the polarizer. The zirconium compound may include at least one of zirconium oxide, ammonium zirconium carbonate, zirconium acetylacetonate, zirconium acetate, zirconium carbonate, zirconium sulfate, zirconium phosphate, potassium zirconium carbonate, zirconium sodium phosphate, sodium zirconium tartrate, zirconium nitrate, and chlorohydroxyoxozirconium.

The zirconium compound may be present in an amount of about 10 parts by weight to about 40 parts by weight, for example, about 15 parts by weight to about 35 parts by weight, based on 100 parts by weight of the polyvinyl alcohol resin. Within these ranges, the water-based bonding agent may exhibit good adhesion to the polarizer.

The crosslinking agent may be an organic crosslinking agent, thereby improving adhesion and water resistance of the water-based bonding agent. For example, the crosslinking agent may include at least one organic crosslinking agent such as glyoxal, formaldehyde, glutaraldehyde, ethylene diamine, hexamethylene diamine, 1,3-bisaminocyclohexane, adipic acid hydrazide, and carbonyl hydrazide.

The crosslinking agent may be present in an amount of about 15 parts by weight to about 35 parts by weight based on 100 parts by weight of the polyvinyl alcohol resin. Within this range, the water-based bonding agent may exhibit good durability and processability.

The water-based bonding agent may have a viscosity of about 15 cPs to about 25 cPs, for example, about 18 cPs to about 22 cPs at 25° C. Within these ranges, the water-based bonding agent may maintain satisfactory adhesion.

The water-based bonding agent may further include inorganic fillers, for example, metal fillers, and thus may exhibit good durability, such as prevention or reduction of cracking in the polarizer, and the like. The inorganic fillers may include: zirconium compounds; tin compounds such as tin oxide; boron compounds such as boric acid; titanium compounds such as tetraalkoxytitanate and water-soluble titanium compounds; and aluminum compounds such as aluminum oxide, aluminum sulfate, aluminum chloride, and aluminum nitrate; and the like. The inorganic fillers may have an average diameter from about 1 nm to about 50 nm. Within this range, the water-based bonding agent may exhibit good durability without significant changes in the optical properties. The inorganic fillers may be present in an amount of about 0.01 parts by weight to about 5 parts by weight based on 100 parts by weight of the polyvinyl alcohol resin.

The protective coating layer may be formed by coating the water-based bonding agent to a thickness of about 5 μm or less, for example, about 50 nm to about 200 nm, onto one surface of the polarizer, followed by drying at about 40° C. to about 60° C., but the protective coating layer is not limited thereto.

The UV curable bonding agent may include an epoxy compound, a (meth)acrylate compound, a photocationic polymerization initiator, and a photoradical polymerization initiator.

Due to its structural integrity, the epoxy compound may impart adhesion of the polarizer to the UV curable bonding agent and provide high reliability. In addition, the epoxy compound may provide cohesion to the adhesive film by physical twisting (entanglement) of molecular chains between the epoxy compound and the (meth)acrylate compound described below, and by chain transfer bonding between the epoxy compound and a hydrophilic group. Further, the epoxy compound has a high glass transition temperature and may impart durability to the adhesive film by supporting the structure of the adhesive film. Furthermore, the epoxy compound may impart interfacial adhesion to the UV curable bonding agent with respect to the polarizer and an optical film due to chemical bonding by the hydroxyl groups generated upon reaction and good wettability thereof. For example, the epoxy compound may have a glass transition temperature of about 50° C. to about 250° C., or about 100° C. to about 200° C. Within these ranges, the epoxy compound may improve the durability of the UV curable bonding agent and impart interfacial adhesion to the UV curable bonding agent with respect to the polarizer and the optical film.

The epoxy compound may be a cation curable epoxy compound polymerized by cations generated from the photocationic polymerization initiators, and may have an epoxy equivalent weight of about 100 g/eq to about 200 g/eq. Within this range, an appropriate curing reaction of the bonding agent may be obtained upon UV irradiation.

The epoxy compound may include an alicyclic epoxy compound, an aromatic epoxy compound, an aliphatic epoxy compound, a hydrogenated epoxy compound, or a mixture thereof. For example, the epoxy compound may include at least one of an alicyclic epoxy compound and an aromatic epoxy compound. Adhesion of the adhesive film and prevention or reduction of cracking in the polarizer under thermal impact may be obtained due to the internal binding force imparted to the bonding agent after curing.

The alicyclic epoxy compound may be a compound in which an alicyclic ring has at least one epoxy group. The alicyclic epoxy compound may be an alicyclic diepoxy carboxylate. For example, the alicyclic epoxy compound may include 3,4-epoxycyclohexylmethyl-3',4'-epoxycyclohexane carboxylate, 2-(3,4-epoxycyclohexyl-5,5-spiro-3,4-epoxy)cyclohexane-meta-dioxane, bis(3,4-epoxycyclohexylmethyl) adipate, bis(3,4-epoxy-6-methylcyclohexyl) adipate, 3,4-epoxy-6-methylcyclohexyl-3',4'-epoxy-6'-methylcyclohexane carboxylate, ε-caprolactone-modified 3,4-epoxycyclohexylmethyl-3',4'-epoxycyclohexane carboxylate, trimethylcaprolactone-modified 3,4-epoxycyclohexylmethyl-3',4'-epoxycyclohexane carboxylate, β-methyl-δ-valerolactone-modified 3,4-epoxycyclohexylmethyl-3'4,'-epoxycyclohexane carboxylate, methylenebis(3,4-epoxycyclohexane), di(3,4-epoxycyclohexylmethyl)ether of ethylene glycol, ethylenebis(3,4-epoxycyclohexanecarboxylate), epoxy cyclo-hexahydro dioctyl phthalate, epoxy cyclo-hexahydro di-2-ethylhexyl phthalate, or the like.

The aromatic epoxy compound may include bisphenol A, bisphenol F, phenol novolac, cresol novolac, bisphenol A-novolac, dichloropentadiene novolac, glycidyl ether of triphenolmethane, triglycidyl p-aminophenol, tetraglycidyl methylene dianiline, or the like.

Non-limiting examples of the aliphatic epoxy compound may include: glycidyl ethers such as 1,4-butanediol diglycidyl ether, 1,6-hexanediol diglycidyl ether, neopentyl glycol diglycidyl ether, trimethyloipropane triglycidyl ether, polyethylene glycol diglycidyl ether, glycerine triglycidyl ether, and polypropylene glycol diglycidyl ether; polyglycidyl ethers of polyether polyols obtained by adding at least one alkylene oxide to aliphatic polyhydric alcohols, such as ethylene glycol, propylene glycol, glycerin, and the like; diglycidyl esters of aliphatic long-chain dibasic acid; monoglycidyl ethers of higher aliphatic alcohol; glycidyl ethers of higher fatty acid; epoxidized soybean oil; butyl epoxy stearate; octyl epoxy stearate; epoxidized linseed oil; epoxidized polybutadiene, and the like.

The "hydrogenated epoxy compound" refers to a resin obtained by selective hydrogenation of an aromatic epoxy resin in the presence of a catalyst under pressure. For example, the aromatic epoxy resin may include: bisphenol type epoxy resins such as diglycidyl ethers of bisphenol A, diglycidyl ethers of bisphenol F, diglycidyl ethers of bisphenol S, and the like; novolac type epoxy resins such as phenol novolac epoxy resins, cresol novolac epoxy resins, and hydroxybenzaldehyde phenol novolac epoxy resins; polyfunctional epoxy resins such as glycidyl ethers of tetrahydroxyphenylmethane, glycidyl ethers of tetrahydroxybenzophenone and epoxidized polyvinyl phenol, and the like. Although the hydrogenated epoxy resin may be obtained by adding hydrogen to a mother nucleus of the aromatic epoxy resin, the hydrogenated epoxy compound is, in one embodiment, a hydrogenated glycidyl ether of bisphenol A (i.e., an aromatic epoxy resin).

The (meth)acrylate compound is a radical curable compound polymerized by a photoradical polymerization initiator, and may not necessarily have a hydroxyl group. However, in some embodiments, the (meth)acrylate compound has at least one hydroxyl group for interfacial adhesion to the polarizer and bonding to the cation-activated epoxy compound. The (meth)acrylate compound may include a monofunctional (meth)acrylate, a polyfunctional (meth)acrylate, or a mixture thereof, depending upon the number of (meth)acrylate groups. The polyfunctional (meth)acrylate may include two or more, for example, two to six (meth)acrylate groups.

In some embodiments, the monofunctional (meth)acrylate having at least one hydroxyl group may include $C_1$ to $C_{10}$ alkyl group-containing (meth)acrylates having at least one hydroxyl group, $C_3$ to $C_{10}$ alicyclic group-containing (meth)acrylates having at least one hydroxyl group, and $C_6$ to $C_{20}$ aryl group-containing (meth)acrylates having at least one hydroxyl group. For example, the monofunctional (meth)acrylate having at least one hydroxyl group may include at least one of 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, 2-hydroxy-3-phenyloxypropyl (meth)acrylate, 4-hydroxycyclopentyl (meth)acrylate, 2-hydroxy-3-phenyloxybutyl (meth)acrylate, and 4-hydroxycyclohexyl (meth)acrylate.

The monofunctional (meth)acrylate free of hydroxyl groups has a (meth)acrylate group and thus may improve curing rate. For example, the monofunctional (meth)acrylate free of hydroxyl groups may include at least one of an unsubstituted $C_1$ to $C_{10}$ alkyl group-containing (meth)acrylate, an unsubstituted $C_3$ to $C_{10}$ alicyclic group-containing (meth)acrylate, an unsubstituted $C_6$ to $C_{20}$ aromatic group-containing (meth)acrylate, and an unsubstituted $C_3$ to $C_{10}$ heteroalicyclic group-containing (meth)acrylate.

The unsubstituted $C_1$ to $C_{10}$ alkyl group-containing (meth)acrylate may include at least one of methyl (meth)acrylate, ethyl (meth)acrylate, n-propyl (meth)acrylate, isopropyl (meth)acrylate, n-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, and decyl (meth)acrylate.

The unsubstituted $C_3$ to $C_{10}$ alicyclic group-containing (meth)acrylate may include at least one of cyclopentyl (meth)acrylate, cyclohexyl (meth)acrylate, and isobornyl (meth)acrylate.

The unsubstituted $C_6$ to $C_{20}$ aromatic group-containing (meth)acrylate may be represented by, for example, Formula 1.

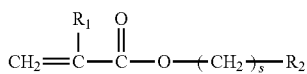

Formula 1

In Formula 1, $R_1$ is a hydrogen atom or a methyl group; s is an integer from 0 to 10; and $R_2$ is phenoxy, phenyl, methylphenyl, methylethyiphenyl, methoxyphenyl, propylphenyl, cyclohexylphenyl, chlorophenyl, bromophenyi, phenylphenyl, benzyl, or benzylphenyl.

In addition, the aromatic group-containing (meth)acrylate may include at least one of phenoxyethyl (meth)acrylate, phenyl (meth)acrylate, phenoxy (meth)acrylate, 2-ethylphenoxy (meth)acrylate, benzyl (meth)acrylate, 2-phenylethyl (meth)acrylate, 3-phenylpropyl (meth)acrylate, 4-phenylbutyl (meth)acrylate, 2-2-methylphenylethyl (meth)acrylate, 2-3-methylphenylethyl (meth)acrylate, 2-4-methylphenylethyl (meth)acrylate, 2-(4-propylphenyl)ethyl (meth)acrylate, 2-(4-(1-methylethyl)phenyl)ethyl (meth)acrylate, 2-(4-methoxyphenyl)ethyl (meth)acrylate, 2-(4-cyclohexylphenyl)ethyl (meth)acrylate, 2-(2-chlorophenyl)ethyl (meth)acrylate, 2-(3-chlorophenyl)ethyl (meth)acrylate, 2-(4-chlorophenyl) (meth)acrylate, 2-(4-bromophenyl)ethyl (meth)acrylate, 2-(3-phenylphenyl)ethyl (meth)acrylate, benzyl (meth)acrylate, and 2-(4-benzylphenyl)ethyl (meth)acrylate, but the aromatic group-containing (meth)acrylate is not limited thereto.

The unsubstituted $C_3$ to $C_{10}$ heteroalicyclic group-containing (meth)acrylate may be n-(meth)acryloylmorpholine.

The photocationic polymerization initiator may include typical photocationic initiators capable of performing the photocurable reaction. The photocationic polymerization initiator may include an onium ion corresponding to a cation and an onium salt corresponding to an anion. Non-limiting examples of the onium ion may include diaryliodoniums such as diphenyliodonium, 4-methoxydiphenyliodonium, bis(4-methylphenyl)iodonium, bis(4-tert-butylphenyl)iodonium, bis(dodecylphenyl)iodonium and the like; triarylsulfoniums such as triphenylsulfonium, diphenyl-4-thiophenoxyphenylsulfonium and the like; bis[4-(diphenylsulfonio)-phenyl]sulfide; bis[4-(di(4-(2-hydroxyethyl)phenyl)sulfonio)-phenyl]sulfide; 5-2,4-(cyclopentadienyl)[1,2,3,4,5,6-η]-(methylethyl)-benzene]-iron($1^+$), and the like. Non-limiting examples of the onium salt may include tetrakis(pentafluorophenyl)borate $((C_6F_5)_4B^-)$, tetrafluoroborate $(BF_4^-)$, hexafluorophosphate $(PF_6^-)$, hexafluoroantimonate $(SbF_6^-)$, hexafluoroarsenate $(AsF_6^-)$, hexachloroantimonate $(SbCl_6^-)$, and the like.

The photoradical polymerization initiator may include phosphorus, triazine, acetophenone, benzophenone, thioxanthone, benzoin, oxime initiators, or mixtures thereof. In some embodiments, the photoradical polymerization initiator is a thioxanthone initiator, whereby the UV curable bonding agent may exhibit further improved cuttability and water resistance.

The UV curable bonding agent may include: about 40 parts by weight to about 60 parts by weight of the epoxy compound; about 40 parts by weight to about 60 parts by weight of the (meth)acrylate compound; about 0.1 parts by weight to about 10 parts by weight of the photocationic polymerization initiator; and about 0.1 parts by weight to about 10 parts by weight of the photoradical polymerization initiator, based on 100 parts by weight of the epoxy compound and the (meth)acrylate compound. Within these ranges, control of the index of refraction between the polarizer and the adhesive layer may be facilitated.

The UV curable bonding agent may have a viscosity of about 30 mPa to about 120 mPa at 25° C. Within this range, the UV curable bonding agent may exhibit good coatability and wettability with respect to the polarizer.

The UV curable bonding agent may further include a heat stabilizer, thereby enabling the polarizing plate to exhibit further improved durability at high temperature. The heat stabilizer may be a typical heat stabilizer. For example, the heat stabilizer may be pentaerythritol tetrakis(3-(3,5-di-tert-butyl-4-hydroxyphenyl)propionate. The heat stabilizer may be present in an amount of about 0.1 parts by weight to about 10 parts by weight based on 100 parts by weight of the total amount of the epoxy compound and the (meth)acrylate compound. Within this range, the polarizer may exhibit further improved durability at high temperatures.

The protective coating layer may be formed by coating the UV curable bonding agent to a thickness of about 5 μm or less, for example, about 50 nm to about 200 nm, onto one surface of the polarizer, followed by curing through irradiation with light at a wavelength of about 200 nm to about 450 nm under conditions of irradiance of about 1 mW/cm² to about 500 mW/cm² and a dose of about 10 mJ/cm² to about 10,000 mJ/cm².

The adhesive layer allows the polarizing plate to be stacked on a liquid crystal display panel and may improve the transmittance of the polarizing plate by controlling the difference in index of refraction between the polarizer and the adhesive layer.

The adhesive layer may have an index of refraction of about 1.49 or greater, for example, about 1.49 to about 1.55. Within these ranges, the difference in index of refraction between the polarizer and the adhesive layer may be reduced, thereby improving the transmittance of the polarizing plate.

The adhesive layer may have a thickness of about 10 μm to about 50 μm. Within this range, the adhesive layer may be used for optical displays.

The adhesive layer may be formed of an adhesive composition including a (meth)acrylic copolymer and a curing agent.

The (meth)acrylic copolymer may be cured by the curing agent to improve the mechanical strength of the adhesive film for polarizing plates, and may be a copolymer of a monomer mixture including an alkyl group-containing (meth)acrylic monomer, a hydroxyl group-containing (meth)acrylic monomer, an aromatic group-containing (meth)acrylic monomer, and a carboxylic acid group-containing (meth)acrylic monomer.

The alkyl group-containing (meth)acrylic monomer may improve the reliability of the adhesive layer, and may include an unsubstituted $C_1$ to $C_{20}$ linear or branched alkyl group-containing (meth)acrylic acid ester. For example, the alkyl group-containing (meth)acrylic monomer may include at least one of methyl (meth)acrylate, ethyl (meth)acrylate, propyl (meth)acrylate, n-butyl (meth)acrylate, t-butyl (meth) acrylate, iso-butyl (meth)acrylate, pentyl (meth)acrylate, hexyl (meth)acrylate, 2-ethyihexyl (meth)acrylate, heptyl (meth)acrylate, octyl (meth)acrylate, iso-octyl (meth)acrylate, nonyl (meth)acrylate, decyl (meth)acrylate, and dodecyl (meth)acrylate, but the alkyl group-containing (meth) acrylic monomer is not limited thereto. A single alkyl group-containing (meth)acrylic monomer may be used, or a combination of alkyl group-containing (meth)acrylic monomers may be used.

The hydroxyl group-containing (meth)acrylic monomer may be a $C_2$ to $C_{20}$ alkyl group-containing (meth)acrylic acid ester, a $C_5$ to $C_{20}$ cycloalkyl group-containing (meth) acrylic acid ester or a $C_6$ to $C_{20}$ aryl group-containing (meth)acrylic acid ester having a hydroxyl group at the end or in the backbone thereof. For example, the hydroxyl group-containing (meth)acrylic monomer may include at least one of 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono (meth)acrylate, 1,6-hexanediol mono(meth)acrylate, pentaerythritol tri(meth)acrylate, dipentaerythritol penta(meth) acrylate, neopentyl glycol mono(meth)acrylate, trimethylolpropane di(meth)acrylate, trimethylolethane di(meth)acrylate, 2-hydroxy-3-phenyloxypropyl (meth) acrylate, 4-hydroxycyclopentyl (meth)acrylate, 4-hydroxycyclohexyl (meth)acrylate, and cyclohexanedimethanol mono(meth)acrylate, but the hydroxyl group-containing (meth)acrylic monomer is not limited thereto. A single hydroxyl group-containing (meth)acrylic monomer may be used, or a combination thereof may be used.

The aromatic group-containing (meth)acrylic monomer may include a monomer represented by Formula 1, above.

The carboxylic acid group-containing (meth)acrylic monomer serves to improve the reliability of the adhesive layer, and may include at least one of (meth)acrylic acid and β-carboxyethyl (meth)acrylate, but is not limited thereto. A single carboxylic acid group-containing (meth)acrylic monomer may be used, or a combination thereof may be used.

The monomer mixture for the (meth)acrylic copolymer may include about 60 wt % to about 85 wt % of the alkyl group-containing (meth)acrylic monomer, about 0.1 wt % to about 10 wt % of the hydroxyl group-containing (meth) acrylic monomer, about 11 wt % to about 30 wt % of the aromatic group-containing (meth)acrylic monomer, and about 0.1 wt % to about 10 wt % of the carboxylic acid group-containing (meth)acrylic monomer. Within these ranges, the adhesive layer may exhibit good adhesion to the protective coating layer and may have an index of refraction of about 1.49 or greater.

The monomer mixture may further include at least one of an alicyclic group-containing (meth)acrylic monomer such as isobornyl (meth)acrylate or the like, and a hetero ring-containing (meth)acrylic monomer such as (meth)acryloylmorpholine or the like.

The (meth)acrylic copolymer may have a weight average molecular weight of about 100,000 g/mol to about 10,000,000 g/mol or less, for example, about 800,000 to about 1,000,000 g/mol. Within these ranges, the adhesive layer may exhibit good reliability. The weight average molecular weight may be measured by gel permeation chromatography. The (meth)acrylic copolymer may have a polydispersity index (PDI) of about 1.5 to about 15, for example, about 2 to about 7. Within these ranges, the adhesive layer may exhibit good reliability. The (meth)acrylic copolymer may have a glass transition temperature of about −52° C. to about −27° C. Within this range, the adhesive layer may minimize or reduce light leakage, as well as provide good stress relieving force and high shrinkage resistance to the polarizing plate by improving its adhesion to glass.

The (meth)acrylic copolymer may be prepared by solution polymerization, photopolymerization, bulk polymerization, or emulsion polymerization, but is not limited thereto. In some embodiments, the (meth)acrylic copolymer is prepared by solution polymerization at a temperature of about 50° C. to about 140° C. for about 5 hours to about 24 hours. Any suitable initiator may be used in the polymerization and may include, for example, an azo polymerization initiator, such as azobisisobutyronitrile or azobiscyclohexanecarbonitrile, and/or a peroxide such as benzoyl peroxide and acetyl peroxide. The initiator may be present in an amount of about 0.01 parts by weight to about 10 parts by weight based on 100 parts by weight of the alkyl group-containing (meth) acrylic monomer. Within this range, the copolymer may be sufficiently polymerized. In the polymerization, the solvent may include at least one of ethyl acetate and methylethylketone, but is not limited thereto.

The curing agent cures the (meth)acrylic copolymer, and may include at least one of an isocyanate compound, an epoxy compound, an aziridine compound, a melamine compound, an amine compound, an imide compound, a carbodiimide compound, and an amide compound.

The isocyanate curing agent may include, for example: hexamethylene diisocyanate (HDI); tolylene diisocyanate (TDI) including 2,4-tolylene diisocyanate, 2,6-tolylene diisocyanate or the like; 4,4'-methylenediphenyl diisocyanate (MDI); xylene diisocyanate (XDI) including 1,3-xylene diisocyanate, 1,4-xylene diisocyanate or the like; hydrogenated toluene diisocyanate; isoform diisocyanate; 1,3-bisisocyanatomethylcyclohexane; tetramethylxylene diisocyanate; 1,5-naphthalene diisocyanate; hexamethylene diisocyanate; 2,2,4-trimethylhexamethylene diisocyanate, 2,4,4-trimethylhexamethylene diisocyanate, trimethylolpropane-modified toluene diisocyanate, trimethylolpropane-modified tolylene diisocyanate, tolylene diisocyanate adducts of trimethylolpropane, xylene diisocyanate adducts of trimethylolpropane, triphenylmethane triisocyanate, methylenebis triisocyanate, or the like, but the isocyanate curing agent is not limited thereto. A single isocyanate curing agent may be used, or or a combination thereof may be used.

The curing agent may be present in an amount of about 0.1 parts by weight to about 5 parts by weight, for example, about 0.1 parts by weight to about 1 part by weight, based on 100 parts by weight of the (meth)acrylic copolymer. Within these ranges, the adhesive layer may exhibit good durability and have a small change in components and properties over time.

The adhesive composition may further include a silane coupling agent. The silane coupling agent may improve the moisture resistance and moist heat resistance of the adhesive layer.

The silane coupling agent may be any suitable silane coupling agent, such as those known to those skilled in the art. For example, the silane coupling agent may include at least one of epoxylated silicon compounds such as 3-glycidoxypropyltrimethoxysilane, 3-glycidoxypropylmethyldimethoxysilane, and 2-(3,4-epoxycyclohexyl)ethyltrimethoxysilane; polymerizable unsaturated group-containing silicon compounds such as vinyltrimethoxysilane, vinyltriethoxysilane, and (meth)acryloxypropyltrimethoxysilane; amino group-containing silicon compounds such as 3-aminopropyl trimethoxysilane, N-(2-aminoethyl)-3-aminopropyl trimethoxysilane, and N-(2-aminoethyl)-3-aminopropyl methyldimethoxysilane; and 3-chloropropyl tri methoxysilane, but the silane coupling agent is not limited thereto. For example, the silane coupling agent may be an epoxy-structured silane coupling agent.

The silane coupling agent may be present in an amount of about 0.1 parts by weight to about 5 parts by weight, for example, about 0.1 parts by weight to about 1 part by weight, based on 100 parts by weight of the (meth)acrylic copolymer. Within these ranges, the adhesive composition may exhibit good durability and have a small change in components and properties over time.

The adhesive composition may further include a solvent. The solvent may include methylethylketone, but is not limited thereto. The adhesive composition may further include typical additives such as UV absorbers, antioxidants and the like.

The adhesive composition may have a viscosity of about 1,000 cP to about 6,000 cP at 25° C. Within this range, thickness adjustment of the adhesive layer may be facilitated, the adhesive layer may not suffer from stain, and the coating surface may be uniform.

At least one of the protective coating layer and the adhesive layer may be formed as a plurality of layers, although not shown in FIG. 1.

Figure 2:
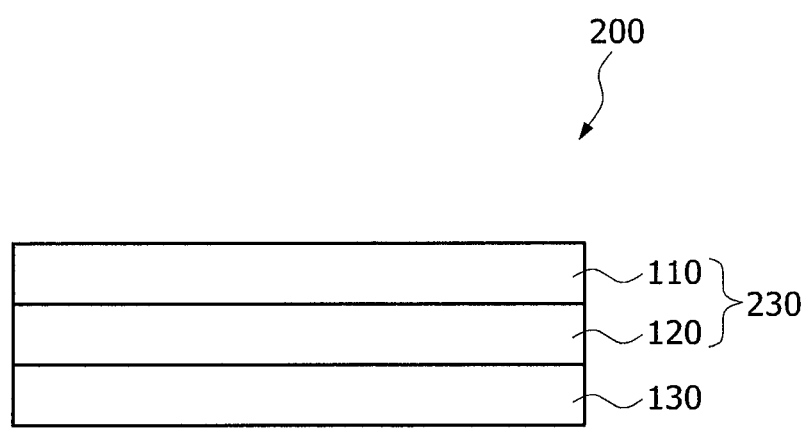
FIG. 2 is a schematic cross-sectional view of a polarizing plate according to another embodiment of the present invention.

FIG. 2 is a schematic cross-sectional view of a polarizing plate according to another embodiment of the present invention. Referring to FIG. 2, a polarizing plate 200 includes a polarizer 110, a protective coating layer 120 on a lower side (surface) of the polarizer 110, and an adhesive layer 130 on a lower side (surface) of the protective coating layer 120. A stack body 230, which includes the polarizer 110 and the protective coating layer 120 on one surface of the polarizer, and the adhesive layer 130 on one surface of the protective coating layer may satisfy Inequality 2:

$$|R_L - R_a| \leq 0.015 \quad (2)$$

In Inequality 2, $R_L$ is the index of refraction of the stack body, and $R_a$ is the index of refraction of the adhesive layer.

This means that the absolute value of the difference in index of refraction between the adhesive layer 130 and the stack body 230 (including the polarizer 110 and the protective coating layer 120) may be about 0.015 or less. When the absolute value of the difference in index of refraction between the adhesive layer and the stack body (including the polarizer and the protective coating layer) is about 0.015 or less, for example, about 0.001 to about 0.015, the polarizing plate may exhibit reduced reflectance at an interface by reducing the difference in index of refraction between the polarizer, the protective coating layer and the adhesive layer, and thus the polarizing plate may exhibit improved transmittance. In some embodiments, the polarizing plate may have a transmittance of about 43% or greater, for example, about 43% to about 45%, at a wavelength of about 400 nm to about 780 nm. The polarizing plate according to this embodiment is substantially the same as the polarizing plate described above in connection with FIG. 1 except that the absolute value of the difference between the index of refraction of the stack body and the index of refraction of the adhesive layer is 0.015 or less.

Figure 3:
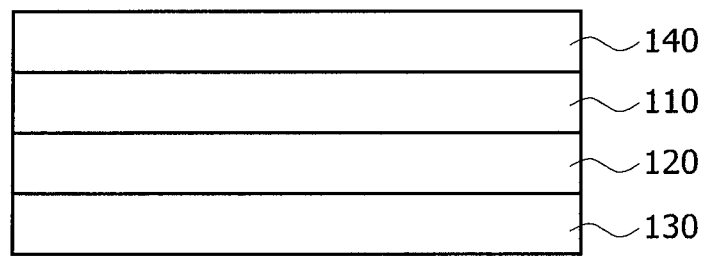
FIG. 3 is a schematic cross-sectional view of a polarizing plate according to a further embodiment of the present invention.

FIG. 3 is a schematic cross-sectional view of a polarizing plate according to a further embodiment of the present invention. Referring to FIG. 3, a polarizing plate 300 includes a polarizer 110, a protective film 140 on an upper side (surface) of the polarizer 110, a protective coating layer 120 on a lower side (surface) of the polarizer 110, and an adhesive layer 130 on a lower side (surface) of the protective coating layer 120. The polarizer 110, the protective coating layer 120 and the adhesive layer 130 may satisfy Inequality 1.

$$R\max - R\min \leq 0.02 \quad (1),$$

In Inequality 1, Rmax is the maximum index of refraction among the indexes of refraction of the polarizer, the protective coating layer and the adhesive layer, and Rmin is the minimum index of refraction among the indexes of refraction of the polarizer, the protective coating layer and the adhesive layer.

This means that the difference between the maximum index of refraction and the minimum index of refraction of the indexes of refraction of the polarizer 110, the protective coating layer 120 and the adhesive layer 130 may be about 0.02 or less. In the polarizing plate of FIG. 3, a protective film is further formed on the upper side of the polarizer. The polarizer may be protected from the outside and the polarizing plate may exhibit improved strength. The polarizing plate according to this embodiment is substantially the same as the polarizing plate according to the one described above in connection with FIG. 1 except that the protective film is further formed.

The protective film may be an optically transparent film having an index of refraction of about 1.45 to about 1.50. Within this range, the protective film may not have an influence (or has only a negligible influence) on the difference in index of refraction between the polarizer, the protective coating layer and the adhesive layer, thereby preventing or reducing deterioration in the transmittance of the polarizing plate. The protective film may be a film formed of at least one of a cellulose resin, including triacetyl cellulose and the like; a polyester resin, including polyethylene terephthalate, polybutylene terephthalate, polyethylene naphthalate, polybutylene naphthalate and the like; a cyclic polyolefin resin, including cyclic olefin resins, norbornene resins and the like; a polycarbonate resin; a polyethersulfone resin; a polysulfone resin; a polyamide resin; a polyimide resin; a polyacrylate resin; a polyvinyl alcohol resin; a polyvinyl chloride resin; and a polyvinylidene chloride resin.

The protective film may have a thickness of about 10 μm to about 100 μm. Within this range, the protective film may be used for optical displays.

Although not shown in FIG. 3, the polarizing plate may further include a bonding layer between the polarizer and the protective film for bonding of the polarizer and the protective film. The bonding layer may be formed of at least one of the water-based bonding agent and the UV curable bonding agent described above.

In addition, although not shown in FIG. 3, the polarizing plate may further include a functional coating layer on an upper side (surface) of the protective film in order to impart an additional function to the protective film or the polarizing plate. For example, the polarizing plate may further include a hard coating layer, an anti-reflective layer, an anti-fingerprint layer, or the like.

According to one or more embodiments of the present invention, a method for manufacturing the polarizing plate includes forming a stack body (including a polarizer and a protective coating layer) having an index of refraction of about 1.45 to about 1.55 on one surface of a polarizer; and bonding an adhesive layer having an index of refraction of about 1.49 or greater, for example, about 1.49 to about 1.55, to one surface of the protective coating layer of the stack body.

According to one or more embodiments of the present invention, the method for manufacturing the polarizing plate may further include bonding a protective film to one surface of the polarizer when forming the stack body.

According to one or more embodiments of the present invention, an optical display includes the polarizing plate according to embodiments of the invention. For example, the optical display may include a liquid crystal display, an organic light emitting display, or the like.

Figure 4:
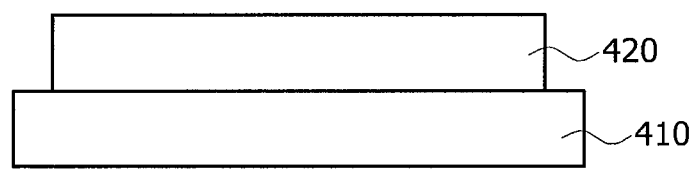
FIG. 4 is a schematic cross-sectional view of a liquid crystal display according to an embodiment of the present invention.

FIG. 4 is a schematic cross-sectional view of a liquid crystal display according to embodiments of the present invention. Referring to FIG. 4, a liquid crystal display 400 includes a liquid crystal display panel 410 and a polarizing plate 420 on one surface of the liquid crystal display panel 410. The polarizing plate 420 may be the polarizing plate according to the embodiments of the invention described above.

Next, certain embodiments of the present invention will be described with reference to some examples. It should be understood that these examples are provided for illustrative purposes only and are not to be construed in any way as limiting the scope of the present invention.

Preparative Example 1: Water-Based Bonding Agent 950 ml of room-temperature water was placed in a reactor, followed by slow addition of 50 g of a polyvinyl alcohol resin (Gohsefimer Z-200, Nippon Synthetic Chemical Industry Co., Ltd.) while stirring. The reactor was heated to 90° C., followed by dissolution for 2 hours, and then slowly cooled, thereby preparing a 5% aqueous solution of a modified polyvinyl alcohol resin. 900 ml of room-temperature water and 100 g of a $SnO_2$ colloid (CELNAX® CX-S301H, Nissan Chemical Industries, Ltd., pH: 6.9, average particle diameter: 10 nm) were mixed, followed by stirring and dispersion using a ball mill, thereby preparing a tin oxide dispersion. Glyoxal (10%, water solution, Nippon Synthetic Chemical Industry Co., Ltd.,) and Zircosol-ZN (25%, water solution, Daiichi Kigenso Kagaku Kogyo Co., Ltd.) were added into the prepared aqueous solution of the modified polyvinyl alcohol, thereby preparing a mixed solution. The prepared tin oxide dispersion was added into the mixed solution, followed by stirring, thereby preparing a water-based bonding agent.

Preparative Example 2: UV Curable Bonding Agent 50 parts by weight of bisphenol A epoxy (KDS-8128, Kukdo Chemical Co., Ltd.) as a cation polymerizable compound, 50 parts by weight of 2-hydroxyethyl acrylate (100%, SK CYTEC Co., Ltd.) as a radical polymerizable compound, and 1 part by weight of pentaerythritol tetrakis (3-(3,5-di-tert-butyl-4-hydroxyphenyl)propionate) (Irganox 1010, Basf Co., Ltd.) as a heat stabilizer, were mixed. 2 parts by weight of hexafluorophosphate iodonium salt (Irgacure-250, Basf Co., Ltd.) as a photocationic polymerization initiator, and 1 part by weight of thioxanthone (DETX-S, Nippon Kayaku Co., Ltd.) as a photoradical polymerization initiator, were mixed with the mixture, thereby preparing a UV curable bonding agent.

Preparative Example 3: Adhesive Layer

A monomer mixture including 63 parts by weight of n-butyl acrylate (BA), 10 parts by weight of methyl acrylate (MA), 1 part by weight of 2-hydroxyethyl acrylate (2-HEA), 25 parts by weight of 2-phenoxyethyl methacrylate (2-PHEA) and 1 part by weight of acrylic acid (AA) were added into a 1 L reactor provided with a cooling device such that reflux of nitrogen gas and temperature adjustment could be easily performed, followed by introduction of 100 parts by weight of ethyl acetate (EA) as a solvent. Next, the reactor was purged by addition of nitrogen gas for 1 hour in order to remove oxygen, followed by maintaining the reactor at 62° C. The monomer mixture was uniformly stirred, followed by addition of 0.08 parts by weight of azobisisobutyronitrile(AIBN) as a reaction initiator, and then allowed to react for 8 hours, thereby preparing an acrylic copolymer A having a weight average molecular weight of 1,000,000 g/mol.

Based on 100 parts by weight of the acrylic copolymer A, 20 parts by weight of methylethylketone as a diluent were placed in a reactor, and 0.4 parts by weight of a diisocyanate of trimethylolpropane adduct (Coronate L, Nippon Polyurethane Co., Ltd.) as a curing agent was added into the reactor, followed by stirring for 5 minutes. 0.2 parts by weight of an epoxy group-containing ethoxysilane (KBM-403, Shin-Etsu Chemical Co., Ltd.) as a silane coupling agent was placed in the reactor, followed by stirring for 20 minutes, thereby preparing an adhesive coating liquid. The coating liquid was coated onto a release film and dried, thereby preparing an adhesive layer having a thickness of 20 μm. The adhesive layer was subjected to irradiation with sodium D rays at 25° C. using an Abbe refractometer (DM-M4, ATAGO Co., Ltd.), to measure the index of refraction of the adhesive layer.

Preparative Examples 4 to 7

Adhesive Layer

Each of the adhesive layers of Preparative Examples 4 to 7 was prepared as in Preparative Example 3 except that the monomers for the acrylic copolymer were prepared as listed in Table 1 below (unit: parts by weight), and the index of refraction of each adhesive layer was measured as described in Preparative Example 3.

TABLE 1

|  |  | Preparative Example 3 | Preparative Example 4 | Preparative Example 5 | Preparative Example 6 | Preparative Example 7 |
| --- | --- | --- | --- | --- | --- | --- |
| Acrylic copolymer |  | A | B | C | D | E |
| Monomers for acrylic copolymer | n-BA | 63 | 68 | 73 | 88 | 78 |
|  | MA | 10 | 10 | 10 | 10 | 10 |
|  | 2-HEA | 1 | 1 | 1 | 1 | 1 |
|  | 2-PHEA | 25 | 20 | 15 | — | 10 |
|  | AA | 1 | 1 | 1 | 1 | 1 |
| Curing agent |  | 0.4 | 0.4 | 0.4 | 0.4 | 0.4 |
| Silane coupling agent |  | 0.2 | 0.2 | 0.2 | 0.2 | 0.2 |
| Weight average molecular weight of acrylic copolymer (g/mol) |  | 1 million | 1 million | 1 million | 1 million | 1 million |
| Index of refraction of adhesive layer |  | 1.523 | 1.501 | 1.494 | 1.446 | 1.472 |

Example 1

A polyvinyl alcohol film (degree of polymerization: 2,400, degree of saponification: 99%, thickness: 60 μm, VF-PS #6000, Kuraray Co., Ltd., Japan) was subjected to expansion in an aqueous solution at 30° C., stretching at a stretching ratio of 3.1 times at 30° C., adsorbing iodine in a 0.02 wt % aqueous solution, and stretching at a stretching ratio of 2 times in a boric acid solution at 57° C. so as to have a final stretching ratio of 6.2 times, thereby manufacturing a polarizer (thickness: 12 μm) having an index of refraction as shown in Table 2, below.

A triacetyl cellulose (TAC) film (thickness: 40 μm) was dipped into a 0.1 N aqueous solution of sodium hydroxide at 50° C. for 2.5 minutes for saponification. The bonding agent of Preparative Example 1 was prepared and allowed to stand at 23° C. for 30 minutes. Next, the bonding agent of Preparative Example 1 was coated onto one surface of the TAC film and one surface of a cyclic olefin polymer (COP) film (thickness: 23 μm) respectively, followed by drying at 23° C. for 30 minutes, thereby forming bonding layers (thickness: 100 nm).

The TAC film including the bonding layer and the COP film including the bonding layer were bonded to one surface and the other surface of the polarizer at 23° C. using a roll machine, respectively, followed by drying at 55° C. for 6 minutes, and then the COP film was removed, thereby manufacturing a stack body. Next, the adhesive layer of Preparative Example 3 was stacked on the surface from which the COP film was removed, thereby manufacturing a polarizing plate.

Example 2

A polarizing plate was manufactured as in Example 1, except that the adhesive layer of Preparative Example 4 was used instead of the adhesive layer of Preparative Example 3.

Example 3

A polarizing plate was manufactured as in Example 2, except that the UV curable bonding agent of Preparative Example 2 was used instead of the water-based bonding agent of Preparative Example 1, and UV curing was performed using a metal halide lamp under conditions of 400 mW/cm$^2$ and 1000 mJ/cm$^2$ instead of drying at 23° C. for 30 minutes.

Example 4

A polarizing plate was manufactured as in Example 1, except that the adhesive layer of Preparative Example 5 was used instead of the adhesive layer of Preparative Example 3.

Comparative Examples 1 to 2

Polarizing plates were manufactured as in Example 1, except that the adhesive layers of Preparative Examples 6 and 7 were used instead of the adhesive layer of Preparative Example 3, respectively.

Comparative Example 3

A polarizing plate was manufactured as in Example 3, except that the adhesive layer of Preparative Example 6 was used instead of the adhesive layer of Preparative Example 3.

Preparative Example 4

The polarizing plate, the adhesive layer, the polarizer and the protective coating layer of each of the Examples and Comparative Examples were evaluated as to the following properties: index of refraction, difference in index of refraction 1 (Rmax−Rmin), difference in index of refraction 2 (|RL−Ra|), transmittance, durability and appearance. The results are shown in Table 2, below.

TABLE 2

|  |  | Example 1 | Example 2 | Example 3 | Example 4 | Comparative Example 1 | Comparative Example 2 | Comparative Example 3 |
|---|---|---|---|---|---|---|---|---|
| Protective coating layer | | Preparative Example 1 | Preparative Example 1 | Preparative Example 2 | Preparative Example 1 | Preparative Example 1 | Preparative Example 1 | Preparative Example 2 |
| Adhesive layer | | Preparative Example 3 | Preparative Example 4 | Preparative Example 4 | Preparative Example 5 | Preparative Example 6 | Preparative Example 7 | Preparative Example 6 |
| Index of refraction | Polarizer | 1.51 | 1.51 | 1.51 | 1.51 | 1.51 | 1.51 | 1.51 |
| | Protective coating layer | 1.509 | 1.509 | 1.496 | 1.509 | 1.509 | 1.509 | 1.496 |
| | Adhesive layer | 1.523 | 1.501 | 1.501 | 1.494 | 1.446 | 1.472 | 1.446 |
| | Stack body of polarizer and protective coating layer | 1.509 | 1.509 | 1.502 | 1.509 | 1.509 | 1.509 | 1.502 |
| Difference in index of refraction 1 (Rmax − Rmin) | | 0.014 | 0.009 | 0.014 | 0.015 | 0.064 | 0.038 | 0.064 |
| Difference in index of refraction 2 ($|R_L - R_a|$) | | 0.014 | 0.008 | 0.001 | 0.015 | 0.063 | 0.037 | 0.056 |
| Transmittance (%) | | 43.61 | 44.04 | 43.5 | 43.00 | 41.54 | 42.67 | 42.21 |
| Durability and Appearance | Heat resistance | ◎ | ◎ | ○ | ○ | X | ○ | X |
| | Moist heat resistance | ◎ | ◎ | ○ | ○ | X | ○ | X |

"Difference in index of refraction 1" refers to the difference between the maximum and minimum values among the indexes of refraction of the polarizer, the protective coating layer and the adhesive layer. Rmax is the maximum index of refraction among the indexes of refraction of the polarizer, the protective coating layer and the adhesive layer, and Rmin is the minimum index of refraction among indexes of refraction of the polarizer, the protective coating layer and the adhesive layer.

"Difference in index of refraction 2" refers to the absolute value of the difference in the index of refraction between the adhesive layer and the stack body (including the polarizer and the protective coating layer). $R_L$ is the index of refraction of the stack body, and $R_a$ is the index of refraction of the adhesive layer.

As shown in Table 2, the polarizing plate according to one or more embodiments of the present invention has high transmittance and exhibits high durability and good appearance at high temperatures and/or high humidities.

On the other hand, the polarizing plates of the Comparative Examples, which had a difference in index of refraction out of the range according to one or more embodiments of the present invention, had lower transmittance than the polarizing plates according to one or more embodiments of the present invention, and exhibited poor durability and appearance.

The properties listed in Table 2 were measured using the following methods:

(1) Index of refraction: the index of refraction was measured by irradiating each of the polarizer, the protective coating layer and the stack body (including the polarizer and the protective coating layer) with sodium D rays at 25° C. using an Abbe refractometer (DM-M4, ATAGO Co., Ltd.).

(2) Difference in index of refraction 1 and Difference in index of refraction 2: The difference in index of refraction 1 and the difference in index of refraction 2 were calculated from the indexes of refraction of the polarizer, the protective coating layer, and the stack body (including the polarizer and the protective coating layer).

(3) Transmittance: The polarizing plate was stacked on an alkali-free glass substrate having a size of 2 cm×4 cm (width×length), and attached to a jig, followed by measuring transmittance at a wavelength of 400 nm to 780 nm using a spectrophotometer (V-7100, Jasco Co., Ltd.).

(4) Durability and Appearance: The polarizing plate was attached to a liquid crystal display cell having a size of 100 mm×60 mm (length×width) and then pressed at 50° C. at 3.5 atm. The polarizing plate was allowed to stand at 85° C. (corresponding to a dry heat condition) for 250 hours, and allowed to stand at 60° C./90% relative humidity (RH) (corresponding to a moist heat condition) for 250 hours, followed by taking out the polarizing plate, which in turn was left at room temperature for 1 hour or longer. Then, the polarizing plate was examined for edge detachment of the adhesive from the polarizing plate. In addition, the polarizing plate was examined for cracks in the machine direction (MD) in a reflection mode and a backlight mode under a fluorescent light to measure the number of cracks, thereby checking whether the sample suffered from defects.

The symbols listed in Table 2 represent the following results:

◎: Neither edge detachment nor cracks
○: No edge detachment but 5 cracks or less
X: Edge detachment and more than 5 cracks While certain exemplary embodiments of the present invention have been illustrated and described, those of ordinary skill in the art will understand that various modifications, changes, alterations, and equivalent embodiments can be made without departing from the spirit and scope of the invention, as described in the following claims, and equivalents thereof.

What is claimed is:
1. A polarizing plate, comprising:
   a stack body comprising a polarizer and a protective coating layer formed directly on a first surface of the polarizer, the polarizer directly contacting the protective coating layer; and an adhesive layer on a first surface of the protective coating layer, the adhesive layer directly contacting the protective coating layer, wherein the polarizing plate satisfies Inequality 2:

$$|R_L - R_a| \leq 0.015 \quad (2),$$

wherein $R_L$ is an index of refraction of the stack body, and $R_a$ is an index of refraction of the adhesive layer, wherein the polarizing plate has a transmittance of about 43% or greater.

2. The polarizing plate according to claim 1, wherein the polarizing plate further satisfies Inequality 1:

$$Rmax - Rmin \leq 0.02 \quad (1),$$

wherein Rmax is a maximum index of refraction among indexes of refraction of the polarizer, the protective coating layer and the adhesive layer, and Rmin is a minimum index of refraction among indexes of refraction of the polarizer, the protective coating layer and the adhesive layer.

3. The polarizing plate according to claim 1, further comprising a protective film on a second surface of the polarizer.

4. The polarizing plate according to claim 1, wherein the polarizer has an index of refraction of about 1.50 to about 1.52, the protective coating layer has an index of refraction of about 1.45 to about 1.55, and the adhesive layer has an index of refraction of about 1.49 or greater.

5. The polarizing plate according to claim 1, wherein the protective coating layer comprises inorganic fillers.

6. The polarizing plate according to claim 5, wherein the inorganic fillers comprise at least one of a zirconium compound, an aluminum compound, a boron compound and a titanium compound.

7. The polarizing plate according to claim 1, wherein the adhesive layer is formed of an adhesive composition comprising a (meth)acrylic copolymer, a curing agent, and a silane coupling agent.

8. An optical display comprising the polarizing plate according to claim 1.

9. The polarizing plate according to claim 1, wherein the protective coating layer is formed of at least one of a water-based bonding agent and a UV curable bonding agent.

10. The polarizing plate according to claim 9, wherein the water-based bonding agent further comprises inorganic fillers.

11. The polarizing plate according to claim 9, wherein the UV curable bonding agent further comprises a heat stabilizer.

12. The polarizing plate according to claim 9, wherein the water-based bonding agent comprises a polyvinyl alcohol resin, a zirconium compound, and a crosslinking agent.

13. The polarizing plate according to claim 9, wherein the UV curable bonding agent comprises an epoxy compound, a (meth)acrylate compound, a photocationic polymerization initiator, and a photoradical polymerization initiator.

14. A method for manufacturing a polarizing plate, the method comprising:

forming a stack body by forming a protective coating layer having an index of refraction of about 1.45 to about 1.55 directly on a first surface of a polarizer such that the polarizer directly contacts the protective coating layer; and bonding an adhesive layer having an index of refraction of about 1.49 or greater to a first surface of the protective coating layer such that the protective coating layer is between the polarizer and the adhesive layer and the adhesive layer directly contacts the protective coating layer, wherein the polarizing plate satisfies Inequality 2:

$$|R_L - R_a| \leq 0.015 \quad (2),$$

wherein $R_L$ is an index of refraction of the stack body, and $R_a$ is an index of refraction of the adhesive layer, and wherein the polarizing plate has a transmittance of about 43% or greater.

15. The method according to claim 14, further comprising:

bonding a protective film to a second surface of the polarizer.

* * * * *